(No Model.)
T. BELL.
NUT LOCK.
No. 284,366. Patented Sept. 4, 1883.
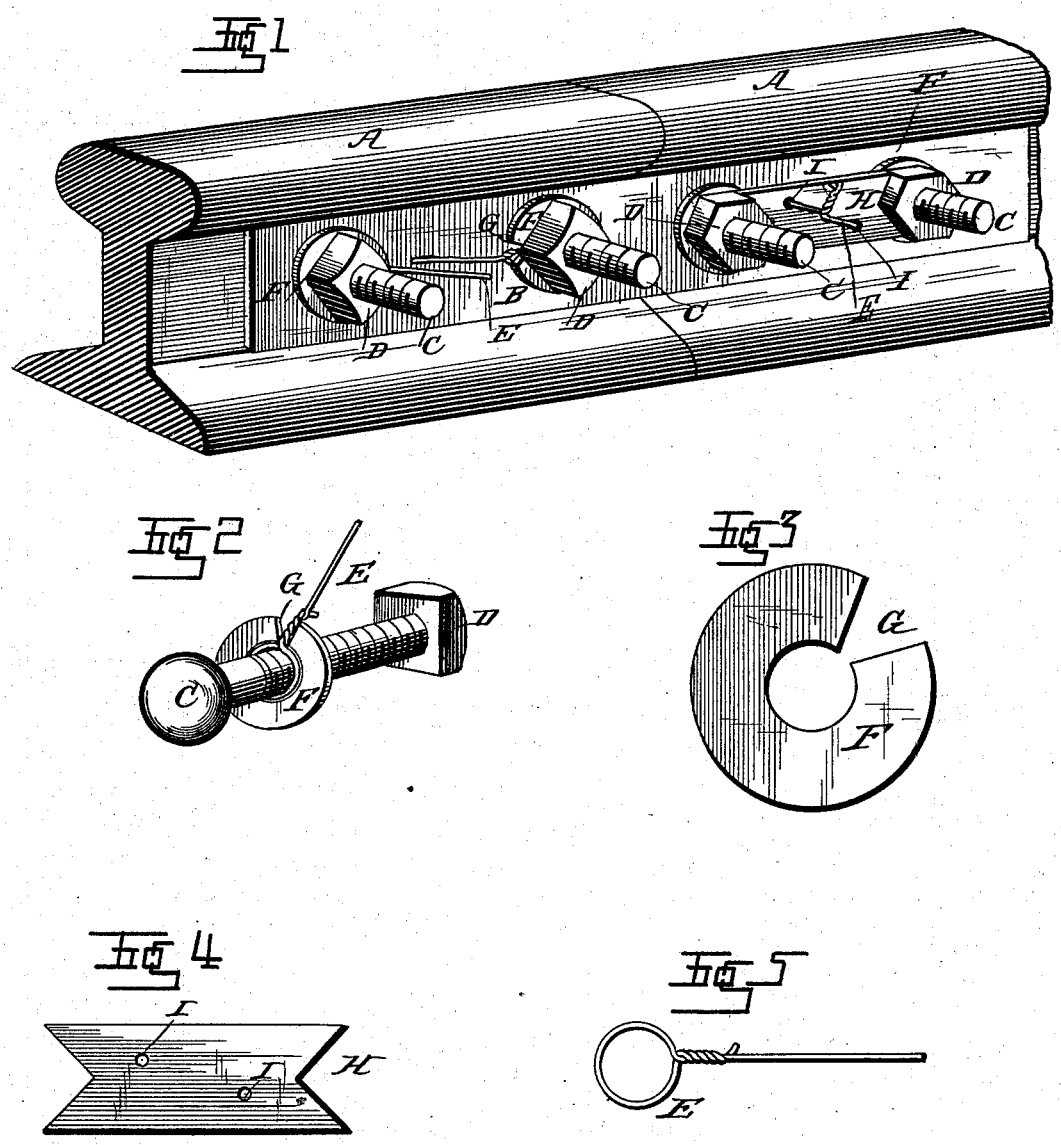
WITNESSES:
Thomas Bell
INVENTOR.
By Louis Bagger & Co
ATTORNEYS.

UNITED STATES PATENT OFFICE.

THOMAS BELL, OF AKRON, OHIO.

NUT-LOCK.

SPECIFICATION forming part of Letters Patent No. 284,366, dated September 4, 1883.

Application filed July 14, 1883. (No model.)

*To all whom it may concern:*

Be it known that I, THOMAS BELL, a citizen of the United States, and a resident of Akron, in the county of Summit and State of Ohio, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a railway-rail joint provided with my improved nut-lock, showing one of the locking-plates removed. Fig. 2 is a perspective view of one of the nutted bolts on an enlarged scale, showing the washer and the wire; and Figs. 3, 4, and 5 are detail views.

Similar letters of reference indicate corresponding parts in all the figures.

My invention has relation to that class of nut-locks used upon railway-rail joints which consist of a slotted or notched plate, into the slots or notches of which the sides of the nuts fit; and it consists in the improved construction and combination of parts of the same, as hereinafter more fully described and claimed.

In the accompanying drawings, the letters A A indicate the ends of the rails, which are united in the usual manner by the fish-plates B, by means of the bolts C and nuts D, which may be square or polygonal. A loop, E, of wire is slipped over each bolt, under the nut, fitting around the same, and having its free ends twisted together, and a washer, F, having a sector-shaped notch, G, fits around the bolt and the wire loop, the free ends of the loop projecting out through the notch, which admits of the nut being screwed home against the washer without interfering with the loop, and of the ends of the loop passing out to a side without being borne down by the nut pressing upon it.

H is a plate of the same length as the distance between each pair of nuts, and having notches in its ends of a shape corresponding to the shape of the nuts, so that the plate may be inserted between each pair of nutted bolts, fitting with its ends around the opposite sides of a pair of nuts, and preventing them from turning, the plate being secured by the free ends of the wire loops of the two bolts being passed through two holes or perforations, I, in the central portion of the plate, and twisted together. In this manner it will be seen that, there being one plate for each two bolts, the nuts will be held in place, prevented from becoming loosened upon the bolts, and if it is desired to remove the nuts the locking-plates may be removed in a moment of time by untwisting the ends of the wire loops, when the plate will slip off their ends, allowing the nuts to turn; and it will also be seen that by having the slotted or notched washers the nuts may be screwed home upon the washers without interfering with the wire loops or breaking them by their pressure upon them.

Having thus described my invention, I claim and desire to secure by Letters Patent of the United States—

1. The combination of two nutted bolts, two wire loops slipped around the bolts below the nuts, and a plate fitting with its ends between the nuts, the ends of the plate being notched correspondingly to the nuts, and held in place by the ends of the wire loops passing through perforations in the plate and twisted together, as and for the purpose shown and set forth.

2. The combination of two nutted bolts, two wire loops slipped around the bolts inside the nuts, washers having sector-shaped notches and fitting upon the bolts inside the nuts, and a plate fitting with its notched ends between the nuts, the notches in its ends corresponding in shape to the shape of the nuts, and held in place by the ends of the wire loops passing through perforations in the same and twisted together upon its outer side, as and for the purpose shown and set forth.

In testimony that I claim the foregoing as my own I have hereto affixed my signature in presence of two witnesses.

THOMAS BELL.

Witnesses:
JOSEPH BELL,
ISAAC BELL.